United States Patent
Kubesh et al.

(10) Patent No.: US 6,581,571 B2
(45) Date of Patent: Jun. 24, 2003

(54) ENGINE CONTROL TO REDUCE EMISSIONS VARIABILITY

(75) Inventors: John Thomas Kubesh, San Antonio, TX (US); Daniel James Podnar, San Antonio, TX (US); John Phillip Latusek, Cedar Falls, IA (US); Donald Lee McCaw, Dike, IA (US)

(73) Assignee: Deere & Company, Moline, IL (US)

( * ) Notice: Subject to any disclaimer, the term of this patent is extended or adjusted under 35 U.S.C. 154(b) by 95 days.

(21) Appl. No.: 09/879,641

(22) Filed: Jun. 12, 2001

(65) Prior Publication Data

US 2002/0185107 A1 Dec. 12, 2002

(51) Int. Cl.⁷ .................................................. F02P 5/00
(52) U.S. Cl. .................................. 123/406.44; 123/679
(58) Field of Search ..................... 123/406.44, 406.45, 123/688, 679, 672; 60/276

(56) References Cited

U.S. PATENT DOCUMENTS

| | | | | |
|---|---|---|---|---|
| 4,244,339 A | * | 1/1981 | Gorille .................. | 123/406.44 |
| 4,466,405 A | * | 8/1984 | Hattori et al. ......... | 123/406.42 |
| 4,698,765 A | * | 10/1987 | Abe et al. .................... | 701/102 |
| 4,716,874 A | * | 1/1988 | Hilliard et al. ........ | 123/406.14 |
| 4,796,590 A | * | 1/1989 | Degobert et al. ...... | 123/406.44 |
| 4,927,517 A | | 5/1990 | Mizutani et al. ............ | 204/406 |
| 5,426,934 A | * | 6/1995 | Hunt et al. .................... | 60/276 |
| 5,622,047 A | | 4/1997 | Yamashita et al. ............ | 60/274 |
| 5,749,333 A | * | 5/1998 | Duret .......................... | 123/295 |
| 5,809,967 A | * | 9/1998 | Masubuchi ............ | 123/406.44 |
| 6,076,393 A | | 6/2000 | Kato et al. .................. | 73/31.05 |
| 6,082,176 A | | 7/2000 | Kondo et al. .............. | 73/23.31 |

FOREIGN PATENT DOCUMENTS

| | | |
|---|---|---|
| EP | 0 308 870 | 3/1989 |
| EP | 0 678 740 A1 | 10/1995 |

OTHER PUBLICATIONS

Kato et al., "Thick Film ZrO2 NOx Sensor For The Measurement Of Low NOx Concentration"; SAE Technical Paper Series 1999–01–0202, 1999.

Kato et al., "Long Term Stable NOx Sensor With Integrated In–Connector Control Electronics"; SAE Technical Paper Series 980170, 1998.

* cited by examiner

*Primary Examiner*—Mahmoud Gimie

(57) ABSTRACT

A system and method of controlling an engine includes sensing a concentration of NOx in exhaust gases produced by the engine and generating a sensed NOx value representative thereof, and controlling an engine control set point as a function of the sensed NOx value. The system also calculates a NOx difference value by subtracting a base NOx value from the sensed NOx value, and if an absolute value of the difference value exceeds a threshold, modifying the set point as a function of the NOx difference value. The method also includes sensing engine RPM, sensing engine manifold absolute pressure (MAP), determining the NOx value as a function of sensed engine RPM and MAP.

12 Claims, 2 Drawing Sheets

ENGINE CONTROL TO REDUCE EMISSIONS VARIABILITY

BACKGROUND OF THE INVENTION

The present invention relates to an electronic engine control system and a method which utilizes an exhaust emissions sensor and adaptively maintains a given emissions level.

Engines exhibit a great deal of variability in terms of emissions output on an engine-to-engine basis. This variability is a natural consequence of the manufacturing variability present in the engine components and sensors used in the control system. This variability creates a problem when engine developers attempt to reach increasingly lower emissions targets. Since the emissions variation must be taken into account, the mean emissions level is forced to be lower than necessary so that the engine that produces emissions higher than the mean remains below the required emissions standard.

For example, if the emissions certification standard is 2.5 g/bhp-hr for NOx emissions, and the amount of variability from engine to engine is 1.0 g/bhp-hr, then the development target for emissions must be 1.5 g/bhp-hr. This reduction in the development target reduces the overall efficiency of the engine. A significant reduction of the variability between engines would allow engines to achieve the same emissions level but with higher efficiency.

U.S. Pat. No. 5,809,967, issued in 1998 to Masubuchi, describes a system which controls ignition timing as a function of sensed exhaust oxygen concentration and sensed exhaust air-fuel ratio. This system is intended to compensate for variations in the fuel supplied to the engine, not to reduce variability of exhaust emissions.

SUMMARY

Accordingly, an object of this invention is to provide a system and a method for reducing the level of emissions variability on engines.

This and other objects are achieved by the present invention, wherein a system and method of controlling an engine includes sensing a concentration of an emission species in exhaust gases produced by the engine and generating a sensed emission species value representative thereof, and controlling engine control system set points, such as spark timing, air/fuel ratio, boost, intake temperature or load, as a function of the sensed emission species value. The method also includes calculating a emission species difference value by subtracting a base emission species value from the sensed emission species value, and if an absolute value of the difference value exceeds a threshold, modifying the engine control system set point as a function of the emission species difference value. The method also includes sensing engine RPM, sensing engine manifold air pressure (MAP), determining the base emission species value as a function of sensed engine RPM and MAP. The method may also include sensing humidity in engine intake air, and correcting the base emission species value as a function of the sensed humidity. The method may also include calculating engine air flow, and correcting the base emission species value as a function of the calculated air flow.

DETAILED DESCRIPTION

Figure 1:
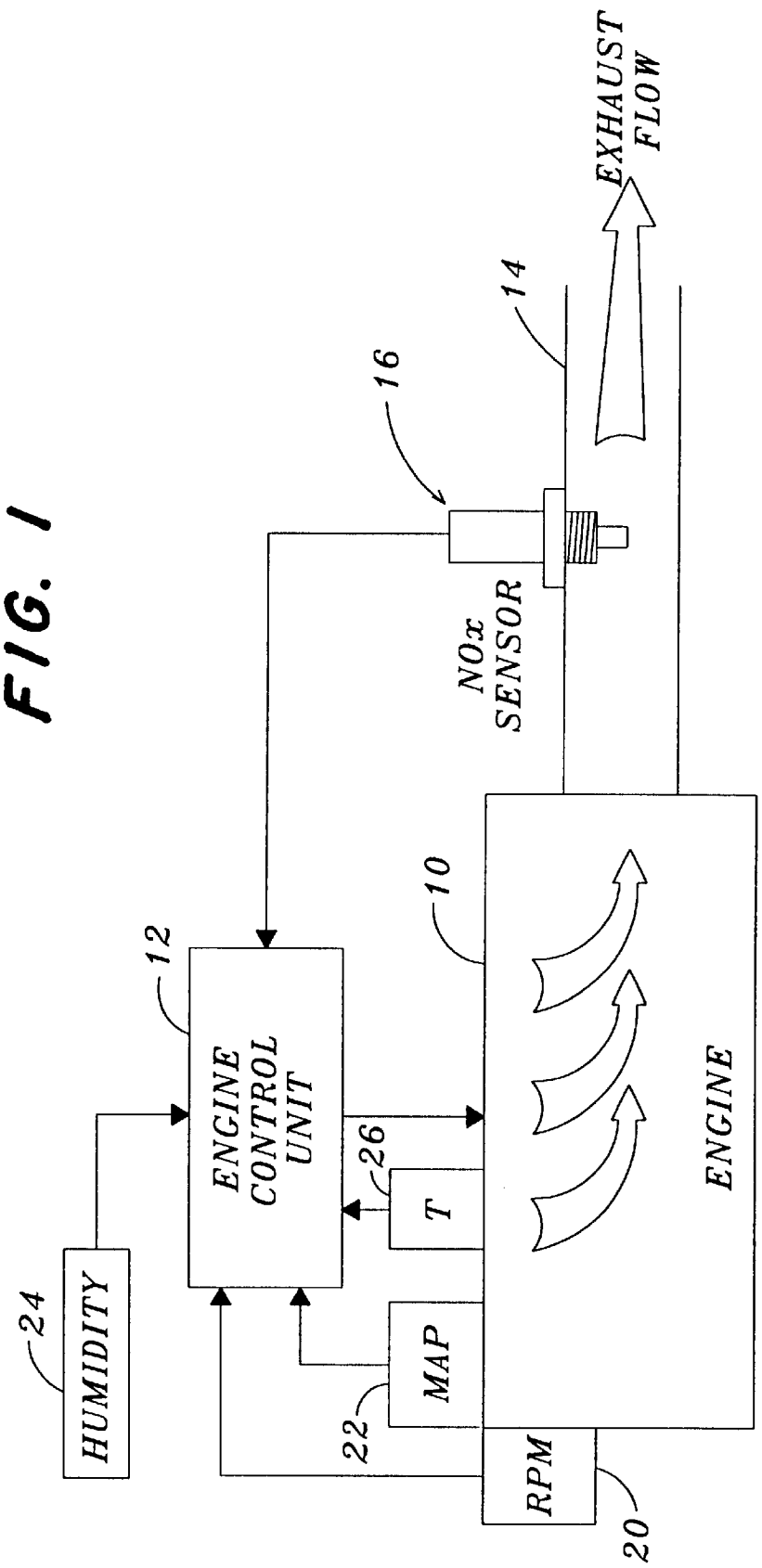
FIG. 1 is a schematic block diagram of the present invention.

With reference to FIG. 1, an engine 10 is controlled by an electronic engine control unit (ECU) 12. Engine exhaust flows through an exhaust pipe 14. An oxide of nitrogen (NOx) sensor unit 16, such as described in U.S. Pat. No. 6,076,393 and in SAE Paper No. 960334, pp. 137–142, 1996, is mounted in the exhaust pipe 14 and generates a NOx signal which represents the amount of NOx in the engine exhaust and communicates this signal to the ECU 12. The ECU 12 also receives an engine speed signal from an conventional engine RPM sensor 20 and a manifold absolute pressure (MAP) signal from a conventional MAP sensor 22 which senses the pressure in an intake manifold of the engine 10. A humidity sensor 24 senses the humidity the engine intake air and supplies a humidity signal to the ECU 12. Optionally, a conventional intake air temperature sensor 26 senses the temperature of the engine intake air and supplies a temperature signal to the ECU 12.

Figure 2:
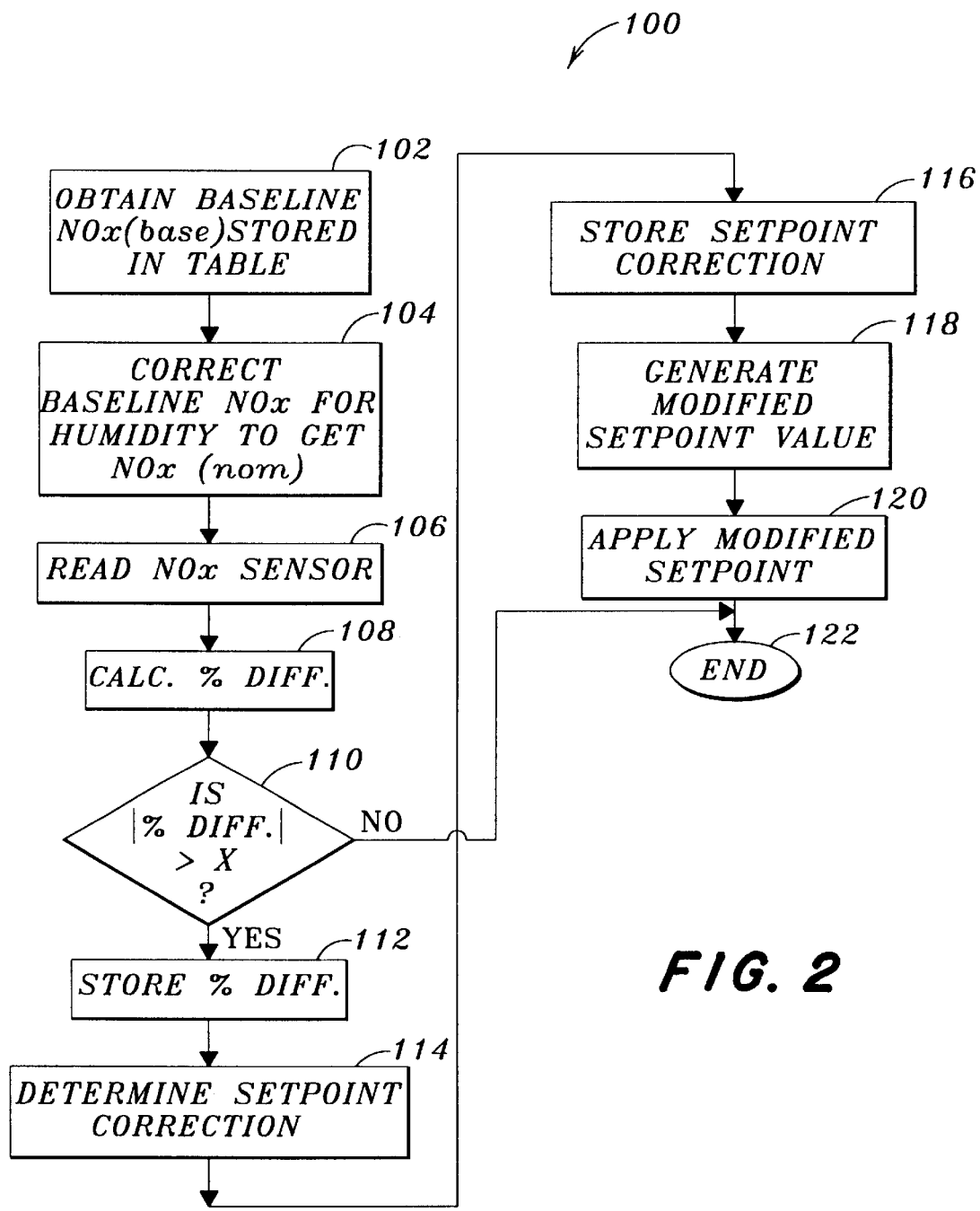
FIG. 2 is logic flow diagram of an algorithm executed by the engine control module of the present invention.

The ECU 12 periodically executes an algorithm or subroutine 100 illustrated by the flow chart of FIG. 2.

In step 102 the ECU obtains a baseline NOx value, NOx(base), stored in a table in a memory of the ECU as a function of the sensed engine speed and as a function of the sensed MAP, or as a function of calculated air flow. Calculated air flow can be determined as a function of sensed MAP, sensed temperature from temperature sensor 26, engine speed from sensor 20 and sensed humidity from sensor 24, and by using the well known relationship described by John B. Heywood on page 54 of "Internal Combustion Engine Fundamentals".

If desired, in step 104, a corrected or nominal NOx value, NOx(nom) is generated as a function of the humidity signal. For example, the nominal NOx concentration would be based on a NOx level at a standard humidity level, and the nominal NOx value can be corrected by an amount determined empirically by observing how changes in humidity effect NOx levels for various engines.

Step 106 reads the sensed NOx value, NOx, from the NOx sensor 16.

Step 108 calculates a percent NOx difference value according to the following equation:

$$\% \ \text{DIFF} = 100 \times (\text{NOx(nom)} - \text{NOx}) \div \text{NOx(nom)}.$$

If the absolute value of % DIFF is not greater than a threshold, such as 5%, step 110 directs the algorithm back to step 122 so that the engine 12 will be controlled with its normal control set point, such as the normal spark timing. If the absolute value of % DIFF is greater than the threshold, step 110 directs the algorithm to step 112.

Step 112 stores the difference value from step 108 in an adaptive table. There is a stored basic table of basic spark timing values as a function of RPM and MAP, which can be determined during engine calibration. There is also an adaptive table which "overlays" the basic table and which includes retarded and advanced (corrected) spark timing values. Step 114 determines the spark timing corrections as a function of the % DIFF value, and step 116 stores these spark timing correction values in the adaptive table. For example, if the % DIFF value is positive, a advancing timing correction value will be generated and stored. If the % DIFF value is negative, a retarding timing correction value will be generated and stored.

Step 118 applies the spark timing correction value from step 114 to the basic stored spark timing value and generates a modified spark timing value as a function of sensed engine speed RPM and manifold air pressure MAP. Finally, step 120 then applies this modified spark timing value to the engine 10 so that the engine will operate in accordance therewith. The algorithm ends at step 122.

The conversion of the above flow chart into a standard language for implementing the algorithm described by the flow chart in a digital computer or microprocessor, will be evident to one with ordinary skill in the art.

Thus, this system combines a chemical sensor, such as a NOx sensor in the exhaust, together with an electronic control system which adaptively adjusts the engine calibration. Preferably, a NOx sensor is used to measure the NOx concentration directly in the engine exhaust stream. This concentration is compared to a nominal NOx concentration for a particular speed and load condition which is stored in a table in the engine controller. If the difference between the sensed and nominal values is greater than a certain amount, the difference is stored in another table. This difference is then used to determine a correction to the engine calibration. For example, the spark timing could be varied slightly to produce the desired change in NOx emissions. This change in spark timing would be stored in an adaptive learn table so that the next time the engine operated at this speed and load condition, the baseline engine calibration would be adjusted automatically by this adaptive table value, and the NOx level should be close to nominal.

This system will reduce the level of emissions variability of an individual engine or of a population of engines. With respect to an individual engine, the NOx deterioration factor, i.e. the relative increase in NOx emissions as the engine ages, could be reduced since the system would maintain a set NOx level. With respect to multiple engines, the NOx variation due to engine variability from manufacturing or sensor variations can be reduced. The system effectively reduces the variability of all of the engine components down to only the variability of the NOx sensor itself.

This technique could also be used to reduce the variability in other emissions species if the sensors for that specific species are available. For example, if a practical hydrocarbon (HC) sensor is developed, a similar set of tables could be implemented for adjusting the calibration to maintain a desired level of HC emissions. Other sensors include, but are not limited to, particulate matter (Pm), non-methane hydrocarbons (NMHC), carbon monoxide (CO), and formaldehyde (HCHO). The means of controlling the emission species, includes but is not limited to spark timing, air/fuel ratio, boost, intake temperature, and load. Also, inputs to the engine including, but not limited to, humidity, oxygen concentration and fuel specification could be modified as variables to maintain the desired output.

This invention can apply to any power producing device that generates NOx or other species that can be monitored, and can be controlled to a degree by changing a control variable or modifying an input to the engine.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A method of controlling an engine to reduce variability of engine exhaust emissions, comprising:

sensing a concentration of oxide of nitrogen (NOx) in exhaust gases produced by the engine with a single NOx sensor which has an output which is substantially proportional to concentration of NOx in said exhaust gases, and generating a sensed NOx value representative thereof;

generating a base NOx value;

calculating an NOx difference value by subtracting the base NOx value from the sensed NOx value; and modifying an engine control system set point as a function of the NOx difference value in order to reduce an amount of NOx in the engine exhaust.

2. The method of claim 1, wherein:

the engine control system set points comprises spark timing.

3. The method of claim 1, further comprising:

sensing engine RPM;

sensing engine manifold air pressure (MAP); and determining the base NOx value as a function of sensed engine RPM and MAP.

4. The method of claim 1, further comprising:

sensing engine RPM;

calculating an engine air flow value; and determining the base NOx value as a function of sensed engine RPM and calculated airflow.

5. The method of claim 1, further comprising:

sensing humidity in engine intake air; and correcting the base NOx value as a function of the sensed humidity.

6. The method of claim 1, further comprising:

if an absolute value of the difference value exceeds a threshold, modifying the set point as a function of the NOx difference value in order to reduce an amount of NOx in the engine exhaust.

7. The method of claim 6, further comprising:

sensing humidity in engine intake air; and correcting the base NOx value as a function of the sensed humidity.

8. A system for controlling an engine to reduce variability of engine exhaust emissions, comprising:

a single NOx concentration sensor in an exhaust of the engine generating a sensed NOx value representative thereof, NOx sensor having an output which is substantially proportional to concentration of NOx in said exhaust gases; and a control unit which generates a base NOx value, calculates a NOx difference value by subtracting the base NOx value from the sensed NOx value, and modifies an engine control system set point as a function of the NOx difference value in order to reduce variability of NOx in the engine exhaust.

9. The control system of claim 8, further comprising:

an engine RPM sensor;

an engine manifold air pressure (MAP) sensor; and the control unit determining the base NOx value as a function of sensed engine RPM and MAP.

10. The control system of claim 8, further comprising:

an engine RPM sensor;

an engine manifold air pressure (MAP) sensor; and the control unit determining the base NOx value as a function of sensed engine RPM and MAP.

11. The control system of claim 8, further comprising:

a humidity sensor for sensing humidity in engine intake air; and the control unit correcting the base NOx value as a function of the sensed humidity.

12. The method of claim 8, wherein:

the control unit, if an absolute value of the NOx difference value exceeds a threshold, modifies the set point as a function of the NOx difference value in order to reduce variability of NOx in the engine exhaust.

* * * * *